(12) United States Patent
Xu et al.

(10) Patent No.: US 11,465,617 B2
(45) Date of Patent: Oct. 11, 2022

(54) VEHICLE PATH PLANNING

(71) Applicant: Ford Global Technologies, LLC, Dearborn, MI (US)

(72) Inventors: Xunnong Xu, Ann Arbor, MI (US); Wen Guo, Dearborn, MI (US); Qi Dai, Dearborn, MI (US); Suzhou Huang, Ann Arbor, MI (US); Dimitar Petrov Filev, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 134 days.

(21) Appl. No.: 16/687,956

(22) Filed: Nov. 19, 2019

(65) Prior Publication Data

US 2021/0146919 A1   May 20, 2021

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *G05D 1/0088* (2013.01);
(Continued)

(58) Field of Classification Search
CPC ... B60W 30/09–0956; B60W 2554/80; B60W 2556/45; G05D 1/0088–0276; G05D 2201/0213
See application file for complete search history.

(56) References Cited

U.S. PATENT DOCUMENTS 8,112,176 B2    2/2012  Solomon
10,965,529 B2 *  3/2021  Magzimof .............. H04L 41/16
(Continued)

FOREIGN PATENT DOCUMENTS

CN         108595823 A       9/2018
WO    WO-2017120336 A2 *   7/2017 ............ B60W 30/08
WO        2019089591 A1     5/2019

OTHER PUBLICATIONS

Madhuri Thakur, "Nash Equilibrium Game Theory", all pages, Wallstreet Mojo website, retrieved Sep. 21, 2021, URL https://www.wallstreetmojo.com/nash-equilibrium-game-theory/ (Year: 2021).*
(Continued)

*Primary Examiner* — Calvin Cheung
(74) *Attorney, Agent, or Firm* — Frank A. MacKenzie; Beijin Bieneman PLC

(57) ABSTRACT

A computer, including a processor and a memory, the memory including instructions to be executed by the processor to determine optimal vehicle actions based on a modified version of a Nash equilibrium solution to a multiple agent game, wherein the Nash equilibrium solution is modified by performing an adaptive grid search optimization technique based on calculating rewards and penalties for the agents to determine optimal vehicle actions, wherein the agents include one or more of autonomous vehicles, non-autonomous vehicles, stationary objects, and non-stationary objects including pedestrians and wherein the rewards and the penalties for the agents are determined by simulating behavior of the agents to determine possible future states for the agents to determine the optimal vehicle actions. The instructions can include further instructions to determine a vehicle path based on the optimal vehicle actions and download the vehicle path to the vehicle.

20 Claims, 6 Drawing Sheets

(51) Int. Cl.
*G05D 1/02* (2020.01)
*G05D 1/00* (2006.01)
(52) U.S. Cl.
CPC ....... *G05D 1/0276* (2013.01); *B60W 2554/80* (2020.02); *B60W 2556/45* (2020.02); *G05D 2201/0213* (2013.01)

(56) References Cited

U.S. PATENT DOCUMENTS

| 2016/0121204 | A1* | 5/2016 | Shen | G06T 7/254 463/40 |
| 2017/0286125 | A1* | 10/2017 | Muralidhar | G06F 9/4411 |
| 2018/0060459 | A1* | 3/2018 | English | B25J 9/1671 |
| 2019/0347371 | A1* | 11/2019 | Sankar | G06Q 10/06315 |
| 2020/0086859 | A1 | 3/2020 | McGill, Jr. et al. | |
| 2020/0135015 | A1* | 4/2020 | Kalabic | G08G 1/0145 |

OTHER PUBLICATIONS

Fox, C. W., et al., "When should the chicken cross the road?: Game theory for autonomous vehicle-human interactions," Feb. 6, 2018, pp. 1-9.

Schwarting et al., "Social behavior for autonomous vehicles", PNAS, Dec. 10, 2019, vol. 116, No. 50, www.pnas.org/cgi/doi/10.1073/pnas.1820676116.

* cited by examiner

VEHICLE PATH PLANNING

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
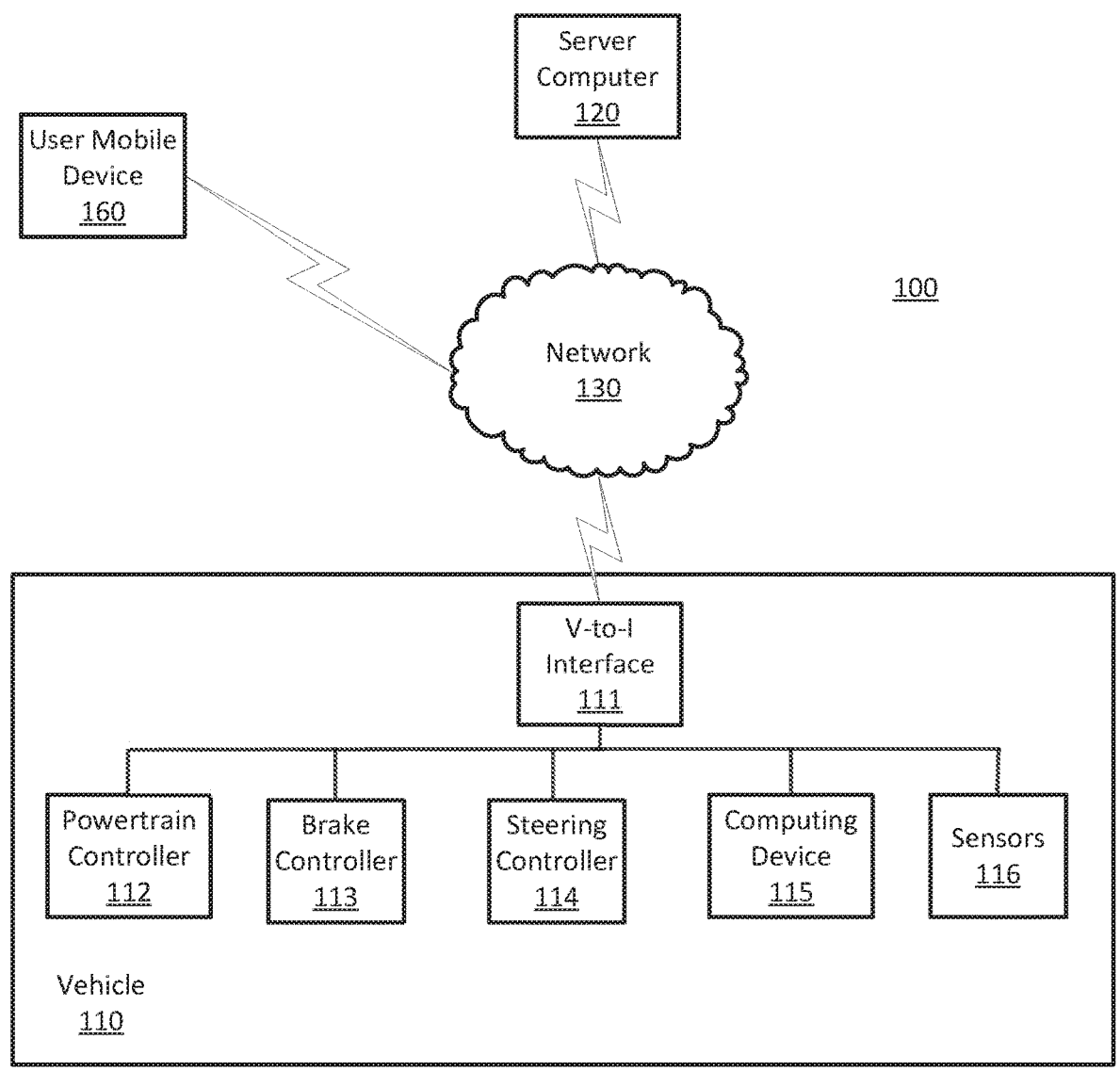
FIG. 1 is a diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

A computing device in a traffic infrastructure system can be programmed to acquire data regarding the external environment of a vehicle and to use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more moving objects such as vehicles and pedestrians, etc., in an environment around a vehicle and can be used by a computing device in the vehicle to operate the vehicle.

The computing device in a traffic infrastructure system can determine a vehicle path upon which to operate a vehicle based on modified version of a Nash equilibrium solution to a multiple agent game, wherein the Nash equilibrium solution is modified by performing an adaptive grid search optimization technique based on rewards and penalties for the agents to determine optimal vehicle actions in real-time at sub-second frequency, i.e. at least 5 Hz. The multiple agents can include one or more of autonomous vehicles, non-autonomous vehicles, stationary objects, and non-stationary objects including pedestrians. The rewards and the penalties for the agents can be determined by simulating behavior of the agents to determine possible future states for the agents to determine the vehicle path.

Disclosed herein is method including determining optimal vehicle actions based on a modified version of a Nash equilibrium solution to a multiple agent game wherein the Nash equilibrium solution is modified by performing an adaptive grid search optimization technique based on rewards and penalties for the agents to determine optimal vehicle actions, wherein the agents include one or more of autonomous vehicles, non-autonomous vehicles, stationary objects, and non-stationary objects including pedestrians, and wherein the rewards and the penalties for the agents are determined by simulating behavior of the agents to determine possible future states for the agents to determine the optimal vehicle actions. A vehicle path can be determined based on the optimal vehicle actions and the vehicle path downloaded to a vehicle. One or more future states can be determined for the agents to determine the optimal vehicle actions using a computing device in the vehicle. The vehicle path can be determined for the vehicle based on the optimal vehicle actions and downloading the vehicle path to the autonomous vehicle. The behavior of the agents can be simulated to determine one or more estimated states for the agents is based on determining one or more of each of agents' locations, agents' speeds, agents' headings and a plurality of possible paths for each agent. The optimal vehicle actions can be determined by evaluating a utility function including the rewards and the penalties for each of the agents.

The utility function for actions of the multiple agents can be determined based on determining estimated states of the stationary and the non-stationary objects determined at time steps t included within a time horizon h and is calculated based on a weighted sum of component utility functions. The utility function can include determining the rewards and the penalties for each of the actions of the agents based on estimated states of the stationary and the non-stationary objects at future time steps t included within the time horizon h. The rewards can be based on one or more of moving forward at desired speeds and the penalties are based on deviating from smooth vehicle operation, wherein the smooth vehicle operation also includes limits on agent acceleration, agent steering and agent braking. The penalties can be based on one or more of lane departure, out of roadway departure, collisions with the stationary objects, and collisions with the non-stationary objects. The rewards and the penalties can be calculated based on sensor data acquired from sensors arranged to observe the multiple agents. The sensors can be arranged to observe the multiple agents are included in a traffic infrastructure system. The vehicle path based on the optimal vehicle actions can be determined based on polynomial functions. The vehicle can be operated along the vehicle path by controlling vehicle powertrain, vehicle steering and vehicle brakes at a frequency of at least 5 Hz. Operating the vehicle can be based on locating one or more objects in sensor data.

Further disclosed is a computer readable medium, storing program instructions for executing some or all of the above method steps. Further disclosed is a computer programmed for executing some or all of the above method steps, including a computer apparatus, programmed to determine optimal vehicle actions based on a modified version of a Nash equilibrium solution to a multiple agent game wherein the Nash equilibrium solution is modified by performing an adaptive grid search optimization technique based on rewards and penalties for the agents to determine optimal vehicle actions, wherein the agents include one or more of autonomous vehicles, non-autonomous vehicles, stationary objects, and non-stationary objects including pedestrians, and wherein the rewards and the penalties for the agents are determined by simulating behavior of the agents to determine possible future states for the agents to determine the optimal vehicle actions, determining a vehicle path based on the optimal vehicle actions and downloading the vehicle path to a vehicle. One or more future states can be determined for the agents to determine the optimal vehicle actions using a computing device in the vehicle. The vehicle path can be determined for the vehicle based on the optimal vehicle actions and downloading the vehicle path to the autonomous vehicle. The behavior of the agents can be simulated to determine one or more estimated states for the agents is based on determining one or more of each of agents' locations, agents' speeds, agents' headings and a plurality of possible paths for each agent. The optimal vehicle actions can be determined by evaluating a utility function including the rewards and the penalties for each of the agents.

The computer can be further programmed to determine the utility function for actions of the multiple agents based on determining estimated states of the stationary and the non-stationary objects determined at time steps t included within a time horizon h and is calculated based on a weighted sum of component utility functions. The utility function can include determining the rewards and the penalties for each of the actions of the agents based on estimated states of the stationary and the non-stationary objects at future time steps t included within the time horizon h. The rewards can be based on one or more of moving forward at desired speeds and the penalties are based on deviating from smooth vehicle operation, wherein the smooth vehicle operation also includes limits on agent acceleration, agent steering and agent braking. The penalties can be based on one or more of lane departure, out of roadway departure, collisions with the stationary objects, and collisions with the non-stationary objects. The rewards and the penalties can be calculated based on sensor data acquired from sensors arranged to observe the multiple agents. The sensors can be arranged to observe the multiple agents are included in a traffic infrastructure system. The vehicle path based on the optimal vehicle actions can be determined based on polynomial functions. The vehicle can be operated along the vehicle path by controlling vehicle powertrain, vehicle steering and vehicle brakes at a frequency of at least 5 Hz. Operating the vehicle can be based on locating one or more objects in sensor data.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
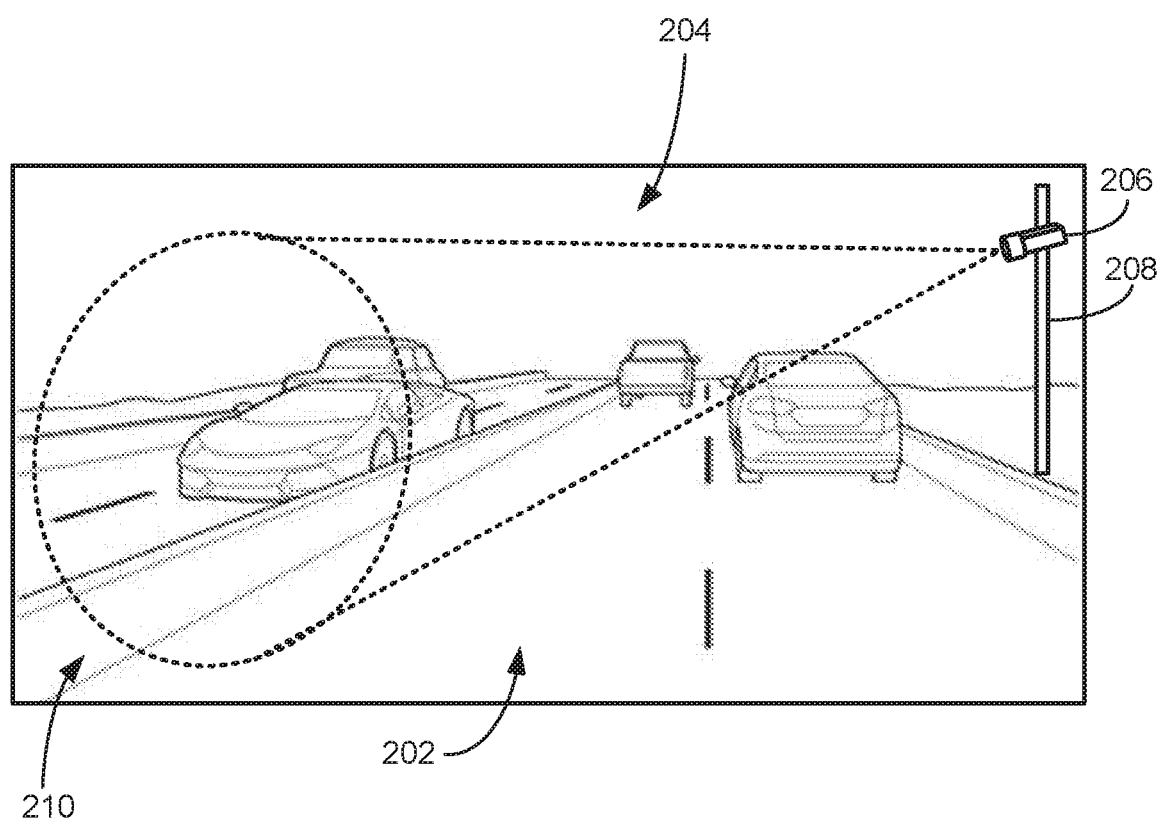
FIG. 2 is a diagram of an example traffic scene.

FIG. 2 is a diagram of a traffic scene 200. Traffic scene 200 includes a roadway 202 and multiple agents including vehicles 204. The multiple agents can include one or more of autonomous vehicles 204, non-autonomous vehicles 204, stationary objects, and non-stationary objects including pedestrians. Vehicles 204 can include autonomous and non-autonomous vehicles 204 as described above in relation to FIG. 1. Traffic scene 200 can also include a video sensor 206 mounted on a pole 208 having a field of view 210. Mounting the video sensor 206 on the pole 208 or other mounting structure such as a tower or building can provide video sensor 206 with a field of view 210 that includes one or more agents including vehicles 204 traveling on the roadway 202. Video sensor 206 can be in communication with a traffic infrastructure system 100 that acquires video data from video sensor 206 regarding agents traveling on a roadway. Sensors included in a traffic infrastructure system 100 are not limited to video sensors 206. Sensors included in a traffic infrastructure system 100 can also include radar, lidar, etc., that can provide the same type of information as video sensors 206.

A traffic infrastructure system 100 can include a plurality of computing devices including a server computer 120. The traffic infrastructure system 100 can include one or more computing devices in communication with one or more video sensors 206 having fields of view 210 that acquire data regarding portions of a roadway 202. Computing devices included in a traffic infrastructure to acquire and process data from portions of a roadway 202 can be referred to as edge computing nodes. Edge computing nodes can include a computing device 115. Edge computing nodes can be networked and joined together in groups that process data regarding contiguous portions of roadways 202, for example intersections. Groups of edge computing nodes can be in communication with other computing devices in a traffic infrastructure system, for example server computers 120, that process data from a plurality of edge nodes and make decisions regarding agent traffic in portions of a roadway 202.

Figure 3:
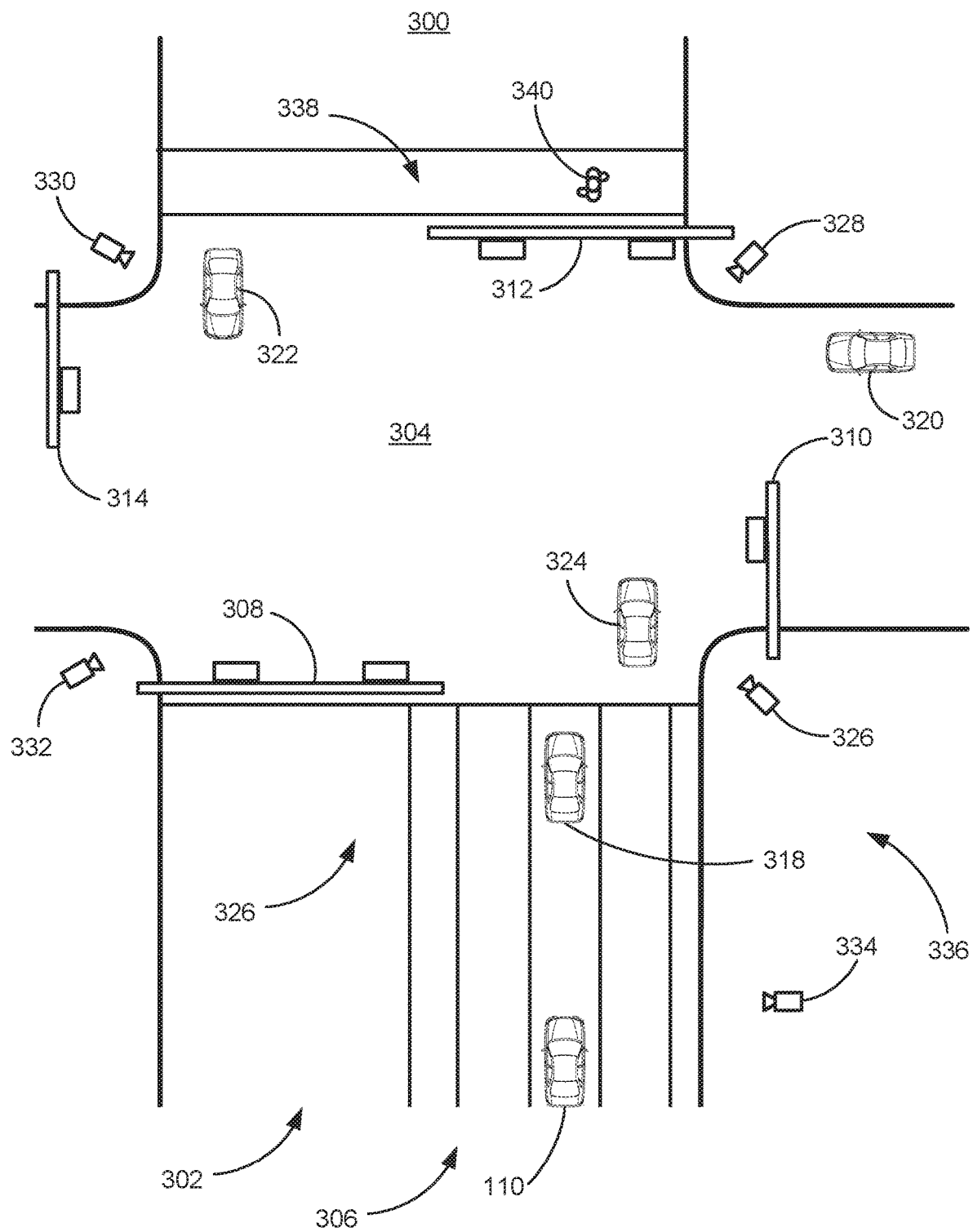
FIG. 3 is a diagram of an example top down view of a traffic scene.

FIG. 3 is a top-down diagram of a traffic scene 300. Traffic scene 300 includes roadways 302. Roadways 302 form an intersection 304. Traffic approaching and traveling within the intersection 304 is controlled by traffic signals 308, 310, 312, 314. Traffic scene 300 including intersection 304 and portions of roadways 302 near the intersection 304 is observed by video sensors 326, 328, 330, 332, 334, collectively sensors 336. Traffic scene 300 can also be observed by other sensors including lidar and radar sensors, for example. Sensors 336 are in communication with one or more edge computer nodes included in a traffic infrastructure system 100, which acquire and process video data from the sensors 336. Objects on roadways 302 are referred to as agents. Agents can be divided into two groups: autonomous vehicle (AV) agents including vehicles 110, 318, 320, referred to herein as AV agents $I_a$ and non-autonomous vehicle (non-AV) agents including non-autonomous vehicles 322, 234, referred to herein as non-AV agents $I_n$, life objects including pedestrian 340, and animals, etc., and static objects including debris, barriers, etc. AV agents $I_a$ include computing devices 115 that communicate with the traffic infrastructure system 100. Computing devices 115 included in the AV agents can be referred to as thin clients because most of the computing tasks included in determining vehicle paths is performed by the traffic infrastructure system 100 and downloaded to the AV agents. In some examples the computation can also be done fully on-board a vehicle 110 by distributing the execution of the adaptiveSeek algorithm to each vehicle agent. The set of all agents I={$I_a$, $I_n$} includes both AV and non-AV agents.

Based on communication with AV agents, the traffic infrastructure system 100 can determine destination and path data for each AV agent. The traffic infrastructure system 100 can also determine lane markings, roadway edges and traffic signs based on map data received from server computers 120 via the Internet, for example. The traffic infrastructure system 100 can also communicate with traffic signals 308, 310, 312, 314 to determine the state of the traffic signals 308, 310, 312, 314, i.e. which color light is currently energized and when the colors change. A traffic control system 100 can determine states of all agents with the fields of view of sensors 336 using edge computer nodes, where an agent state includes a location, a speed and a heading. Static object states include locations and zero velocity, where velocity includes speed and heading. Based on map data regarding the roadway 302, data regarding the traffic signal 308, 310, 312, 314 states, data regarding AV agent $I_a$ destinations, and short-term estimates of non-AV agents $I_n$ based on a prescribed path scenario or action sequence, a decision-making function included in an edge computing node included in a traffic infrastructure system 100 can determine optimal vehicle paths to download to AV agents $I_a$ that permit the AV agents $I_a$ to travel to their respective destinations with a prescribed speed while avoiding contact with other agents I. Prescribed path scenarios or action sequences can be determined, given the derived actions, using a generic kinematic model (further explained below) that determines future locations, speed, and directions for non-AV agents $I_n$ based on observed location, speed, and direction for each non-AV agent $I_n$.

Determining a vehicle path can include determining a vehicle path spline upon which to operate an AV agent $I_a$, including a vehicle 110. A vehicle path spline is defined by piecewise polynomials that include a series of n connected points in the X, Y plane that includes predicted vehicle 110 trajectories at n future time steps. A vehicle path can include predicted vehicle speed and accelerations at points along the path polynomial. Constraints on a vehicle path polynomial can limit the longitudinal and lateral accelerations to be applied to the vehicle 110, 314, 318, 320, where braking torque and powertrain torque are applied as positive and negative longitudinal accelerations and clockwise and counter-clockwise steering torque are applied as left and right lateral accelerations. A computing device 115 in a vehicle 110 can operate the vehicle 110 to cause the vehicle 110 to travel along a vehicle path by controlling vehicle powertrain, steering and brakes via controllers 112, 113, 114 as discussed above in relation to FIG. 1 at predicted speeds and accelerations.

Commonly used techniques for vehicle path planning for vehicles 110 combine search algorithms with rule-based heuristics. Markov decision processes, reinforcement learning deep neural networks and inverse reinforcement learning deep neural networks are examples of machine learning and optimization techniques that can be used for vehicle path planning. Techniques discussed herein improve vehicle path planning by using game theory based techniques that introduce an alternative approach to path planning that enables a human-like negotiating type solution to the path planning. One main advantage of present techniques is that they avoid constraints of predefined rule-based decisions, neural network fixed input/state/output structure, and the need for exhaustive simulation of the machine learning methods.

Techniques discussed herein discuss a computationally efficient method for path planning derived as a modified version of the Nash equilibrium solution of a multi-agent game. Nash equilibrium solutions are solutions to non-cooperative games where each player is assumed to know the strategies of the other players and no one player can gain an advantage by changing strategies unilaterally while the other players keep their optimal strategies unchanged. In techniques described herein, Nash equilibrium solutions are modified by using a grid search based adaptive optimization technique that results in a flexible algorithm allowing alternative formulations of the path planning problem that are applicable to different self-driving settings and a changing environment. Grid search based adaptive optimization refers to a computational technique that calculates outcome values based on a grid populated with scores calculated for multiple rewards and penalties for multiple agents including calculating pairwise rewards and penalties for pairs of agents. This technique is referred to as an "adaptiveSeek" solution because it determines optimal solutions based on searching the grid populated with scores for all agents over a finite time horizon h to determine a best (optimal) score for all agents simultaneously.

An adaptiveSeek solution can be performed as a traffic infrastructure centric solution, where vehicle paths are determined by one or more edge computing nodes for multiple AV agents $I_a$ where the AV agents $I_a$ communicate with edge computer nodes included in a traffic infrastructure system 100 that coordinates traffic for a given traffic scene 300. Other examples can be referred to as distributed vehicle path planning where all sensing, data acquisition and vehicle path planning are performed by computing devices 115 included in each of the AV agents $I_a$, with minimal input from edge computer nodes included in a traffic infrastructure system 100. In distributed vehicle path planning systems, the edge computer nodes can communicate sensor data from sensors 336 to each of the AV agents $I_a$, for example, to augment sensor data acquired by each of the AV agents $I_a$.

Edge computing nodes can acquire data regarding non-AV agents $I_n$ that do not communicate vehicle paths to the edge computing nodes including non-autonomous vehicles 322, 324 and one or more pedestrians 340. Other agents that do not communicate determined vehicle paths or locations to edge computing nodes can include bicycles, animals and static objects, for example. Edge computing devices can use time series data acquired from sensors 336 regarding non-AV agents $I_n$ that do not communicate vehicle paths to determine predicted paths for non-AV agents $I_n$ based on the location and observed motion of the agents. For example, a pedestrian 340, observed to be moving in a crosswalk 338 can be assumed to continue moving within the crosswalk 338 at the observed speed. A non-AV agent $I_n$ can have multiple determined paths in examples where different directions of motion are possible. For example, in traffic scene 300 vehicle 324 can continue straight ahead or turn right. Edge computing nodes can also acquire location information regarding stationary objects that affect traffic in roadways 302 such as traffic barriers, construction signs, and debris.

Figure 4:
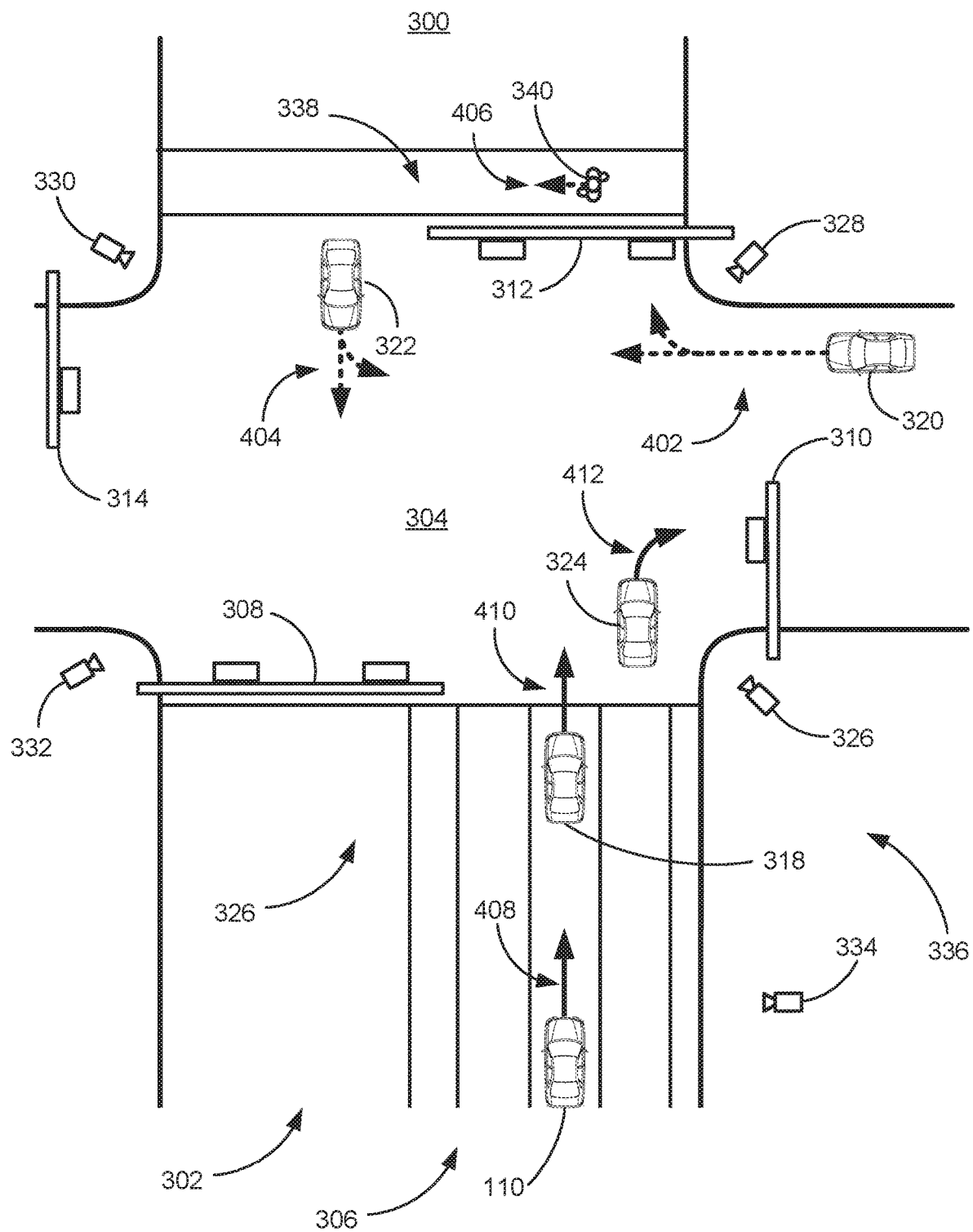
FIG. 4 is a diagram of another example top down view of a traffic scene.

FIG. 4 is a diagram of traffic scene 300 with non-AV agent $I_n$ paths 402, 404, 406 (dotted lines with arrows). Non-AV agent $I_n$ paths 402, 404, 406 can be determined by an edge computing node in a traffic infrastructure system 100 based on data acquired by sensors 336. An edge computing node in communication with one or more sensors 336 can acquire a time sequence of video images of traffic scene 300 and, using machine vision techniques including convolutional deep neural networks, identify and track objects in the fields of view of sensors 336. By determining the location, orientation and magnification of lenses included in each sensor 336 and thereby determining fields of view 210 corresponding to each sensor 336, the location, speed and direction of each non-AV agent $I_n$ can be estimated. Based on the location of each non-AV agent $I_n$ within the traffic scene 300 and traffic rules corresponding to the locations one or more paths 402, 404, 406 can be predicted for each non-AV agent L. For example, according to traffic rules corresponding to intersection 304, vehicle 322 is permitted to turn left or go straight, vehicle 320 is permitted to turn right or go straight and pedestrian 340 is permitted to continue crossing the roadway 302 within crosswalk 338. By acquiring sensor data from sensors 336 with edge computing nodes included in a traffic infrastructure system 100, processing the data to determine objects states, including locations, speeds, and directions for objects included in the sensor data, and combining the determined locations, speeds and directions with traffic rules determined based on map data, one or more paths 402, 404, 406 can be determined for each non-AV agent $I_n$ included in a traffic scene 300.

An edge computing node included in a traffic infrastructure system 100 can, at a time instant t, receive sensor data from sensors 336, process the sensor data to determine object states for each non-AV agent $I_n$ included in a traffic scene 300, determine vehicle paths for each AV agent $I_a$ and each non-AV agent $I_n$ over a time horizon of length h, determine optimal actions for each of the AV agents $I_a$, and communicate the optimal actions to the AV agents $I_a$. The edge computing node can share the states to all the connected objected in its range. The AV agents can choose to follow the determined optimal actions predicted by the edge computing node or combine the state data with data from their on-board sensors to determine their own optimal actions by implementing the adaptiveSeek algorithm. The edge computing node can perform these five activities at a rate of five Hz or greater, where the time horizon length h can be greater than five seconds, for example. The optimal actions are illustrated by vehicle paths 408, 410, 412 for vehicles 324, 318, 110, respectively and can include longitudinal accelerations and steering directions. The optimal actions are determined based on calculating an adaptiveSeek solution as discussed in relation to FIG. 5, below.

Techniques discussed herein can improve operation of AV agents $I_a$ including a vehicle 110 by determining vehicle paths that permit the AV agents $I_a$ to reach a desired destination with maximum allowable speed while avoiding contact with all agents in view of sensors 336 included in a traffic scene 300 by making short-term estimates regarding future states of non-AV agents $I_n$ over a finite time horizon h based on a generic kinematic model. A generic kinematic model is a technique for calculating future object location, speed, and direction based on a bicycle model of vehicle motion, where a vehicle is assumed to have two wheels, with one of the wheels supplying the motive power (driving) and one of the wheels supplying the direction (steering). The bicycle model simplifies calculations of vehicle state while producing accurate results. An adaptiveSeek solution can be calculated for a vehicle-centric system where it is assumed that AV agents $I_a$ are equipped with vehicle sensors including one or more of video cameras, lidar sensors, and radar sensors and a computing device 115 that acquires data from the vehicle sensors and/or edge sensors and can determine a vehicle path based on calculations performed by a computing device 115 included in a vehicle 110. The calculations are identical to the infrastructure-centric solution except only one AV agent $I_a$ (a vehicle 110, for example) is considered.

Figure 5:
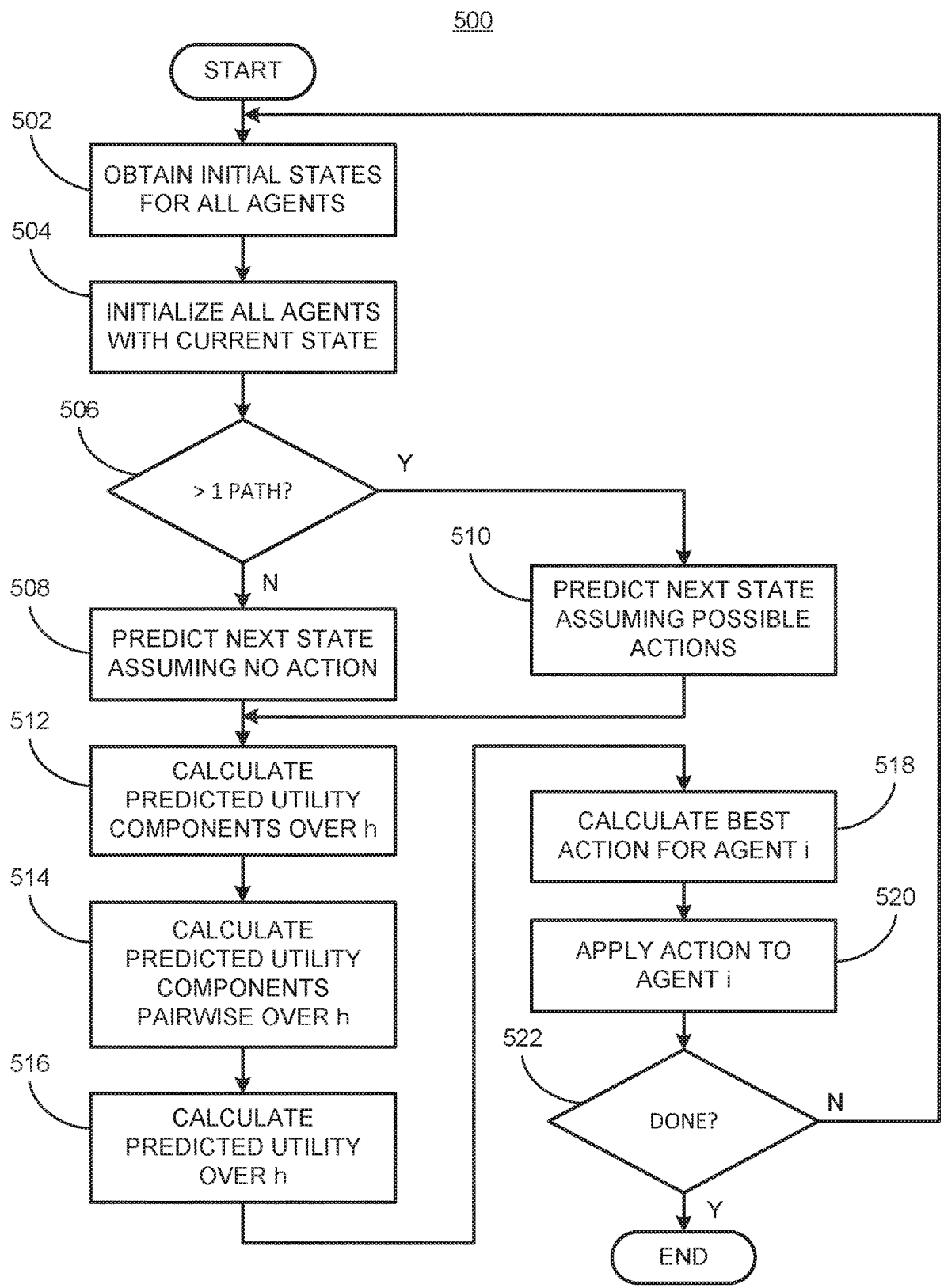
FIG. 5 is a flowchart diagram of an example process to determine an adaptiveSeek solution.

FIG. 5 is a flowchart diagram of a process 500 described in relation to FIGS. 1-4, of a process 500 for determining vehicle actions based on calculating an adaptiveSeek solution to determine optimal actions including vehicle paths for one or more AV agents $I_a$. Process 500 can be implemented by a processor of computing device, taking as input information from sensors, and executing commands, and outputting object information, for example. Process 500 can be implemented at the edge computing device or in-vehicle computing device 115. When implementing in the edge device, data can be acquired from the sensors at edge. When implementing in the vehicle, data can be from both edge and in-vehicle sensors, for example. Process 500 includes multiple blocks that can be executed in the illustrated order. Process 500 could alternatively or additionally include fewer blocks or can include the blocks executed in different orders.

As explained above, an adaptiveSeek solution is a modified version of a Nash equilibrium solution to a multiple agent game where the Nash equilibrium solution is modified using an adaptive grid search optimization technique. Determining the adaptiveSeek solution to the multiple agent game includes calculating rewards and penalties for the multiple agents based on penalty and reward functions $\phi_{i,t}^{(k)}$. Calculating the reward and penalty functions includes simulating behavior of the multiple agents to determine possible future states for the multiple agents to determine the optimal vehicle actions. Vehicle state is defined by the location, speed and direction of a vehicle. The optimal vehicle state is a vehicle path that starts at the current vehicle position and travels to a vehicle destination while maximizing rewards and minimizing penalties. An infrastructure-centric system assumes that the adaptiveSeek solution is determined by an edge computing node, where three-dimensional (3D) objects that are not AV agents $I_a$ are identified by the edge computing node as non-AV agents $I_n$ and include human driven vehicles, static objects (road debris, barriers, etc.) and life objects including pedestrians, policemen, animals, etc.).

Process 500 begins at block 502, where a computing device 115 included in an edge computing node determines initial states for all agents I={$I_a$, $I_n$}. Object states, including positions, speeds and directions are measured based on acquired sensor data. Object states of static objects are identified by location and zero speed. Location speed, and direction for AV agents $I_a$ can be based on communication with each of the AV agents $I_a$, using network 110, for example. Roadway features including lane markings, traffic signals, etc. can be determined based on combining acquired sensor data and downloaded map data.

At block 504 all agents I are initialized with a current state including location, speed and direction determined either by processing acquired sensor data for non-AV agents $I_n$ or by communication with an AV agent $I_a$ via a network 110. Each state $s=[x\ y\ v\ \varphi]^T$, which is a transposed vector where x and y are the coordinates of the center of mass of the object, v is the speed and $\varphi$ is the inertial heading or direction.

At block 506 a computing device 115 included in an edge computing node determines for each agent I whether the agent I has one possible future path or more than one future path as described above in relation to FIG. 4. For agents I with one future path, process 500 passes to block 508. For agents I with more than one future path, process 500 passes to block 510.

At block 508 a computing device 115 included in an edge computing node determines the change in the state of an agent having one possible future path at time step t according to an input $a=[\alpha\ \delta]^T$, which is a transposed vector where $\alpha$ is the longitudinal acceleration and $\delta$ is the steering angle applied to a kinematic bicycle model of the agent i. The input a is applied to the state s of an agent i at time step t by the following equations:

$$x_{i,t+1} = x_{i,t} + \Delta t\ v_{i,t}\ \cos(\varphi_{i,t} + \beta_{i,t}) \quad (1)$$

$$y_{i,t+1} = y_{i,t} + \Delta t\ v_{i,t}\ \sin(\varphi_{i,t} + \beta_{i,t}) \quad (2)$$

$$\varphi_{i,t+1} = \varphi_{i,t} + \Delta t\ \frac{v_{i,t}}{L}\ \cos(\beta_{i,t})\ \tan(\delta_{i,t}) \quad (3)$$

$$\beta_{i,t} = \tan^{-1}\left(\frac{b}{L}\ \tan(\delta_{i,t})\right) \quad (4)$$

$$v_{i,t+1} = v_{i,t} + \Delta t \alpha_{i,t} \quad (5)$$

Where model parameters L and b correspond to the vehicle wheelbase and the distance from the center of mass of the rear axle and $\beta$ is the slip angle. Slip angle is the difference between steering angle (direction a wheel is pointing) and the direction the wheel is actually moving with respect to the roadway. Other models, for example dynamic vehicle models that include linear, discrete point mass descriptions, or kinematic models that include double integration to account for both longitudinal and latitudinal accelerations, can be used in addition to equations 1-5.

At block 510 a computing device 115 included in an edge computing node can iterate through all possible paths corresponding to an agent i in examples where more than a single path is determined to be possible for an agent i. In this example, equations 1-5 are calculated for each possible path to predict the next states for each possible path.

At block 512 a computing device 115 included in an edge computing node calculates the predicted utility functions for each agent i over a time horizon h by determining reward and penalty component functions. Reward and penalty functions include a rewards for maintaining desired speed $\phi_{i,t}^{(1)}$, smooth acceleration $\phi_{i,t}^{(2)}$, smooth steering $\phi_{i,t}^{(3)}$, smooth braking, and steering angle $\phi_{i,t}^{(4)}$, and penalties for lane departure $\phi_{i,t}^{(5)}$, out of road travel $\phi_{i,t}^{(6)}$, and crash penalty with a stationary object $\phi_{i,t}^{(7)}$ based on control variables for acceleration a and steering angle $\delta$ according to the following equations:

$$\phi_{i,t}^{(1)} = 1 - \left(\frac{v_{i,t} - v_0}{v_0}\right)^2 \quad (6)$$

$$\phi_{i,t}^{(2)} = (\alpha_{i,t} - \alpha_{i,t-1})^2 \quad (7)$$

$$\phi_{i,t}^{(3)} = (\delta_{i,t} - \delta_{i,t-1})^2 \quad (8)$$

$$\phi_{i,t}^{(4)} = \ln(1 + \exp[\kappa^{(4)}(\alpha - \overline{\alpha})]) + \ln(1 + \exp[-\kappa^{(4)}(\alpha - \underline{\alpha})]) \quad (9)$$

$$\phi_{i,t}^{(5)} = \min[(y_{i,t}^2 - (W/2)^2)^2/(3W^4/4), 1] \quad (10)$$

$$\phi_{i,t}^{(6)} = S(\kappa^{(6)}(|y_{i,t}| - (W + w/2))) \quad (11)$$

$$\phi_{i,t}^{(7)} = S(\kappa_x^{(7)}(x_{i,t} + l_x^{(7)})) \cdot S(-\kappa_y^{(7)}(y_{i,t} - l_y^{(7)})) \quad (12)$$

Where parameters W and w characterize a roadway and parameters $\kappa_x$, $\kappa_y$, $l_x$ and $l_y$ define dynamics and a safety envelope between a stationary object and an AV agent i, where the safety envelope includes a risk premium. A collision penalty $\phi_{ij,t}^{(8)}$ between an agent i and another moving agent j assuming rectangular shapes for the agents i, j can be determined by the equation:

$$\phi_{ij,t}^{(8)} = [\tilde{S}(\kappa_x^{(8)}(\Delta x_{ij,t} + l_x^{(8)})) + \tilde{S}(\kappa_x^{(8)}(l_x^{(8)} - \Delta x_{ij,t}))] \cdot [\tilde{S}(\kappa_y^{(8)}(\Delta y_{ij,t} + l_y^{(8)})) + \tilde{S}(\kappa_y^{(8)}(l_y^{(8)} - \Delta y_{ij,t}))] \quad (13)$$

Where parameters $\kappa_x$, $\kappa_y$, $l_x$ and $l_y$ define the dynamics and safety envelope (risk premium) between the AV agent i and the other moving agent j.

At block 514 a computing device 115 included in an edge computing node determines predicted utility components for each AV agent i over a time horizon h based on the formula:

$$g_k(\phi_{i,t}^{(k)}(a_{i,t}|\tilde{s}_{i,t};h)) \quad (14)$$

The utility components are defined using functions $g_k$ that determine the manner in which the utility components $\phi_{i,t}^{(k)}$ are aggregated over a time period h. For safety critical components, namely out-of-road, crash or collision penalties $\phi_{i,t}^{(6)}$, $\phi_{i,t}^{(7)}$, $\phi_{i,t}^{(8)}$, $g_k(\ )$ is defined as the maximum of the penalties. For moving rewards $\phi_{i,t}^{(1)}$ and lane departure penalty $\phi_{i,t}^{(5)}$, $g_k(\ )$ is defined as the average of the components. For roughness penalty $\phi_{i,t}^{(2)}$, $\phi_{i,t}^{(3)}$, and $\phi_{i,t}^{(4)}$, $g_k(\ )$ is defined by its first time period.

At block 516 a computing device 115 included in an edge computing node determines utility components based on equation (13), above, to determine utility functions in a pairwise fashion between an AV agent i and non-moving objects and moving agents j according to crash or collision components $\phi_{i,t}^{(7)}$ and $\phi_{ij,t}^{(8)}$, which can be used to determine penalties for crashes or collisions between AV agents i and non-moving objects and moving agents j. In this example the function $g_k(\ )$ is defined as the maximum of the penalties $\phi_{i,t}^{(7)}$ and $\phi_{ij,t}^{(8)}$.

At block 518 a computing device 115 included in an edge computing node determines the predicted utility for function $\tilde{u}_{i,t}(a_{i,t}|s_{i,t};h)$ based on the equation:

$$\tilde{u}_{i,t}(a_{i,t}|s_{i,t};h) = \Sigma_k w_{i,k} g_k(\phi_{i,t}^{(k)}(a_{i,t}|\tilde{s}_{i,t};h)) \quad (15)$$

The utility function $\tilde{u}_{i,t}(a_{i,t}|s_{i,t};h)$ is updated at each time step t and evaluates the possible alternatives to obtain the optimal action for an AV agent i. The utility function is defined as a weighted sum using weights $w_{i,k}$ to sum functions $g_k$ that determine the manner in which the utility components $\phi_{i,t}^{(k)}$ are aggregated over a time period h in a manner mentioned above. Weights $w_{i,k}$ can be fine-tuned by using optimization technique and real data acquired from vehicles 110 by observing driving behaviors.

At block 518 a computing device 115 included in an edge computing node evaluates the estimated utility function $\tilde{u}_{i,t}(a_{i,t}|s_{i,t};h)$ for an AV agent i over all of the possible pairings with all possible non-AV agents at a given local range to determine the best action for the AV agent i. Evaluating the estimated utility function in this fashion will avoid collisions involving non-AV agents and will provide the appropriate speed path to achieve a destination consistent with smooth acceleration, steering and braking.

At block 520 a computing device 115 included in an edge computing node can communicate the determined action (vehicle path) to the AV agent i via a network 110.

At block 522 a computing device 115 included in an edge computing node can increment the value of i and check to see if any more AV agents i remain to be processed. If one or more AV agents i remain to be processed to determine vehicle actions, process 500 loop back to block 502 to begin processing the next AV agent i. If no more AV agents i remain unprocessed, process 500 ends.

Figure 6:
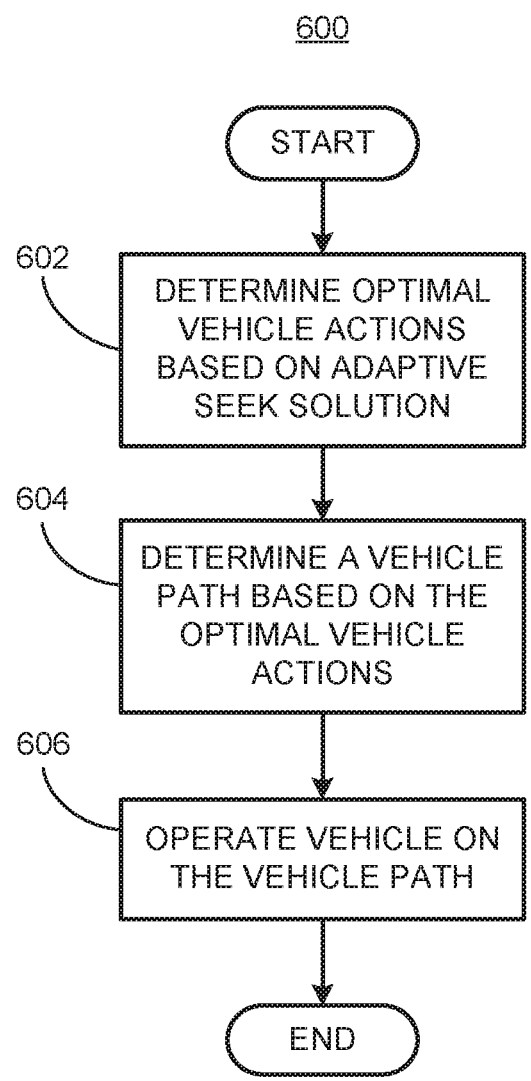
FIG. 6 is a flowchart diagram of an example process to operate a vehicle using an adaptiveSeek solution.

FIG. 6 is a diagram of a flowchart, described in relation to FIGS. 1-65, of a process 600 for operating a vehicle based on an adaptiveSeek solution. Process 600 can be implemented by a processor of computing device, taking as input information from sensors, and executing commands, and outputting object information, for example. Process 600 includes multiple blocks that can be executed in the illustrated order. Process 600 could alternatively or additionally include fewer blocks or can include the blocks executed in different orders.

Process 600 begins at block 602, where an optimal vehicle path is determined for a vehicle 110 by an edge computing node of a traffic infrastructure system 100 based on an adaptiveSeek algorithm as described in relation to FIG. 5, above. As discussed above in relation to FIGS. 4 and 5 the adaptiveSeek algorithm is a grid search algorithm that evaluates utility functions for all of the AV and non-AV agents I included in a traffic scene. Each AV agent i is evaluated to determine an optimal action considering all likely actions for AV and non-AV agents and stationary objects. As a result, all actions for all AV agents i including a vehicle 110 will be optimized simultaneously over a finite time period h.

At block 604 an optimal action for a vehicle 110 is communicated from the edge computing node of the traffic infrastructure system 100 to a vehicle 110. The vehicle 110 can determine a vehicle path based on the optimal action as discussed above in relation to FIG. 2 by combining the optimal action with data acquired by vehicle sensors to determine a path polynomial upon which to operate. Blocks 602 and 604 can also be performed in a vehicle 110 without the help from the edge computing node by using data from onboard sensors and by implementing the adaptiveSeek algorithm of process 500 as illustrated in FIG. 5.

At block 606 the vehicle 110 can operate by using a computing device 115 to control vehicle powertrain, steering and brakes via controllers 112, 113, 114 to operate vehicle powertrain, vehicle steering and vehicle brakes. Following block 606 process 600 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising an infrastructure computer and a vehicle computer, the infrastructure computer including a first processor, and a first memory; the vehicle computer including a second processor and a second memory,
   the first memory of the infrastructure computer including first instructions executable by the first processor to:
   determine optimal vehicle actions based on a modified version of a Nash equilibrium solution to a multiple agent game, wherein the Nash equilibrium solution is modified by performing an adaptive grid search optimization technique based on calculating rewards and penalties for the agents to determine optimal vehicle actions, wherein the agents include one or more of autonomous vehicles, non-autonomous vehicles, stationary objects, and non-stationary objects including pedestrians and wherein the rewards and the penalties for the agents are determined by simulating behavior of the agents to determine possible future states for the agents to determine the optimal vehicle actions;

determine a vehicle path for a vehicle based on the optimal vehicle actions;
download the vehicle path to the vehicle; and
the second memory of the vehicle computer including second instructions executable by the second processor to operate the vehicle on the vehicle path by controlling one or more of vehicle powertrain, vehicle steering, or vehicle brakes.

2. The system of claim 1, wherein simulating the behavior of the multiple agents to determine one or more estimated states for the agents is based on determining one or more of each of agents' locations, agents' speeds, agents' headings and a plurality of possible paths for each agent.

3. The system of claim 1, the first instructions including further instructions to determine the optimal vehicle actions by evaluating a utility function including the rewards and the penalties for each of the agents.

4. The system of claim 3, wherein the utility function for actions of the agents is based on determining estimated states of the stationary and the non-stationary objects determined at time steps t included within a time horizon h and is calculated based on a weighted sum of component utility functions.

5. The system of claim 4, wherein the utility function includes determining the rewards and the penalties for each of the actions of the agents based on estimated states of the stationary and the non-stationary objects at future time steps t included within the time horizon h.

6. The system of claim 1, wherein the rewards are based on one or more of moving forward at desired speeds and the penalties are based on deviating from smooth vehicle operation, wherein the smooth vehicle operation also includes limits on agent acceleration, agent steering and agent braking.

7. The system of claim 1, wherein the penalties are based on one or more of lane departure, out of roadway departure, collisions with the stationary objects, and collisions with the non-stationary objects.

8. The system of claim 1, the first instructions including further instructions to calculate the rewards and the penalties based on sensor data acquired from sensors included in a traffic infrastructure system arranged to observe the multiple agents.

9. The system of claim 1, the instructions including further instructions to operate the vehicle along the vehicle path by controlling vehicle powertrain, vehicle steering and vehicle brakes at a frequency of at least 5 Hz.

10. A method, comprising:
determining optimal vehicle actions based on a modified version of a Nash equilibrium solution to a multiple agent game, wherein the Nash equilibrium solution is modified by performing an adaptive grid search optimization technique based on calculating rewards and penalties for the agents to determine optimal vehicle actions, wherein the agents include one or more of autonomous vehicles, non-autonomous vehicles, stationary objects, and non-stationary objects including pedestrians and wherein the rewards and the penalties for the agents are determined by simulating behavior of the agents to determine possible future states for the agents to determine the optimal vehicle actions;
determining a vehicle path based on the optimal vehicle actions;
downloading the vehicle path to a vehicle; and
operating the vehicle on the vehicle path by controlling one or more of vehicle powertrain, vehicle steering, or vehicle brakes.

11. The method of claim 10, wherein determining one or more future states for the agents to determine the optimal vehicle actions is performed using a computing device in the vehicle.

12. The method of claim 10, wherein simulating the behavior of the agents to determine one or more estimated states for the agents is based on determining one or more of each of agents' locations, agents' speeds, agents' headings and a plurality of possible paths for each agent.

13. The method of claim 10, further comprising determining the optimal vehicle actions by evaluating a utility function including the rewards and the penalties for each of the agents.

14. The method of claim 13, wherein the utility function for actions of the multiple agents is based on determining estimated states of the stationary and the non-stationary objects determined at time steps t included within a time horizon h and is calculated based on a weighted sum of component utility functions.

15. The method of claim 14, wherein the utility function includes determining the rewards and the penalties for each of the actions of the agents based on estimated states of the stationary and the non-stationary objects at future time steps t included within the time horizon h.

16. A computer for a vehicle, comprising a processor, and a memory, the memory including instructions executable by the processor to:
determine optimal vehicle actions based on a modified version of a Nash equilibrium solution to a multiple agent game, wherein the Nash equilibrium solution is modified by performing an adaptive grid search optimization technique based on calculating rewards and penalties for the agents to determine optimal vehicle actions, wherein the agents include one or more of autonomous vehicles, non-autonomous vehicles, stationary objects, and non-stationary objects including pedestrians and wherein the rewards and the penalties for the agents are determined by simulating behavior of the agents to determine possible future states for the agents to determine the optimal vehicle actions;
determine a vehicle path for the vehicle based on the optimal vehicle actions; and
operate the vehicle on the vehicle path by controlling one or more of vehicle powertrain, vehicle steering, or vehicle brakes.

17. The computer of claim 16, wherein simulating the behavior of the agents to determine one or more estimated states for the agents is based on determining one or more of each of agents' locations, agents' speeds, agents' headings and a plurality of possible paths for each agent.

18. The computer of claim 16, the instructions further including instructions to determine the optimal vehicle actions by evaluating a utility function including the rewards and the penalties for each of the agents.

19. The computer of claim 18, wherein the utility function for actions of the multiple agents is based on determining estimated states of the stationary and the non-stationary objects determined at time steps t included within a time horizon h and is calculated based on a weighted sum of component utility functions.

20. The computer of claim 19, wherein the utility function includes determining the rewards and the penalties for each of the actions of the agents based on estimated states of the stationary and the non-stationary objects at future time steps t included within the time horizon h.

* * * * *